United States Patent
Roe

(10) Patent No.: US 9,318,110 B2
(45) Date of Patent: Apr. 19, 2016

(54) AUDIO TRANSCRIPTION GENERATOR AND EDITOR

(75) Inventor: Kenneth D. Roe, Rockville, MD (US)

(73) Assignee: ROE MOBILE DEVELOPMENT LLC, Potomac, MD (US)

( * ) Notice: Subject to any disclaimer, the term of this patent is extended or adjusted under 35 U.S.C. 154(b) by 68 days.

(21) Appl. No.: 13/607,781

(22) Filed: Sep. 9, 2012

(65) Prior Publication Data

US 2013/0066630 A1    Mar. 14, 2013

Related U.S. Application Data

(60) Provisional application No. 61/532,586, filed on Sep. 9, 2011.

(51) Int. Cl.
  *G10L 15/00*  (2013.01)
  *G10L 15/22*  (2006.01)
  *G10L 15/26*  (2006.01)

(52) U.S. Cl.
  CPC .............. *G10L 15/22* (2013.01); *G10L 15/265* (2013.01); *G10L 2015/221* (2013.01)

(58) Field of Classification Search
  CPC ....... G10L 25/265; G10L 15/22; G10L 17/02; G10L 15/30; G10L 13/043; G10L 15/265; G10L 15/26; G10L 15/197; G10L 15/28; H04M 2201/40; H04M 2201/60; H05K 999/99; G06F 17/30746; G06F 17/289; G06F 9/04; G06F 9/4428; G09B 21/009; H04L 29/06027
  USPC ................ 704/235, 231, 247, 249, 251, 270, 704/270.1, 271, 272, 275, 277, E15.043
  See application file for complete search history.

(56) References Cited

U.S. PATENT DOCUMENTS

| | | | | |
|---|---|---|---|---|
| 5,799,273 | A * | 8/1998 | Mitchell et al. | 704/235 |
| 5,884,258 | A * | 3/1999 | Rozak et al. | 704/251 |
| 5,960,447 | A * | 9/1999 | Holt et al. | 715/201 |
| 6,195,637 | B1* | 2/2001 | Ballard et al. | 704/235 |
| 6,513,003 | B1* | 1/2003 | Angell et al. | 704/235 |
| 7,027,985 | B2* | 4/2006 | Wutte | 704/235 |
| 7,039,586 | B2* | 5/2006 | Swinney | 704/235 |
| 8,370,141 | B2* | 2/2013 | Rothschild | 704/235 |
| 8,538,754 | B2* | 9/2013 | Cohen et al. | 704/235 |
| 2002/0062214 | A1* | 5/2002 | Hanson | 704/260 |
| 2002/0143544 | A1* | 10/2002 | Gschwendtner | 704/260 |
| 2003/0200093 | A1* | 10/2003 | Lewis et al. | 704/260 |
| 2005/0159950 | A1* | 7/2005 | Roth et al. | 704/236 |
| 2006/0149558 | A1* | 7/2006 | Kahn et al. | 704/278 |
| 2012/0232907 | A1* | 9/2012 | Ivey | 704/273 |
| 2014/0075387 | A1* | 3/2014 | Fujibayashi | 715/833 |

* cited by examiner

*Primary Examiner* — Daniel Abebe
(74) *Attorney, Agent, or Firm* — Mannava & Kang, P.C.; Arash Behravesh

(57) ABSTRACT

A system for correcting errors in automatically generated audio transcriptions includes an audio recorder, a computerized transcription generator, a voice recording, a collection of link data, transcription text, an audio player, a system of cross linking, and a text editor including a text display with a cursor. The system permits a user to correct transcription errors using techniques of jump to position; show position; and track playback.

20 Claims, 3 Drawing Sheets

Thorns core and seven years ago are fathers brought forth on this continent a new
               5                     10                 15                 20 nation, conceived in liberty, and dedicated to the proposition fat all men are
              25                 30                 35                 40 created equal. . . .
              45 . . .

. . . and fat government of the people, by the people, for the people, shall not
. . .         1330          1335          1340          1345 perish from the earth.
             1350

Fig. 3

AUDIO TRANSCRIPTION GENERATOR AND EDITOR

CROSS-REFERENCE TO RELATED APPLICATIONS

This application claims the benefit of provisional application Ser. No. 61/532,586, filed Sep. 9, 2011, which is relied upon and incorporated herein by reference.

BACKGROUND OF THE INVENTION

The present invention is in the technical field of audio transcription. More particularly, the present invention is in the technical field of automatic generation of written transcripts of audio input. Yet more particularly, the present invention is in the technical field of correcting errors in mechanically, electronically, or otherwise automatically-generated audio transcriptions.

SUMMARY OF THE INVENTION

The present invention is a tool for correcting errors in electronically generated, mechanically generated, (or mechanical turk) generated audio transcriptions. The transcription generation process is not as yet completely reliable and often the text returned by the system contains many errors.

The present invention is directed at providing a user with an easy process for correcting flaws in the resulting text from an automated transcription. Consider the problem of transcribing an hour long recording of a meeting. Many voice recognition technology applications can produce a meaningful transcription. However, there will be numerous errors that require the user to correct by hand afterwards. This invention is useful for both automated processes in which a computer program produces transcriptions and mechanical turk processes in which a recording is broken down into several small pieces each being given to a different human worker, or "turk" to translate.

The present invention overcomes these shortcomings of the prior art by providing a tool, process, and/or system for correcting errors created by the automatic transcription process. The present invention provides a tool, process, and/or system that links the positions in the text to times in the recording. This allows the user to quickly navigate from one to the other when correcting errors. The present invention can include an audio player (for the original recording) that is linked to an editor for the text.

If turks were used to produce the transcription, then the original and corrected transcriptions can be compared and the links can be used to identify the turk responsible for a particular portion of the transcription. Alternatively if a computer algorithm was used to produce the transcription, edited text (along with links) can be sent back so that the transcription can perform machine learning and produce better results on successive iterations.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

FIG. 3 is a graphical representation of an exemplary transcription being edited by the present invention.

It is to be understood that both the foregoing general description and the following detailed description are exemplary and explanatory only, and are intended to provide an explanation of various embodiments of the present teachings.

DETAILED DESCRIPTION OF THE INVENTION

Figure 1:
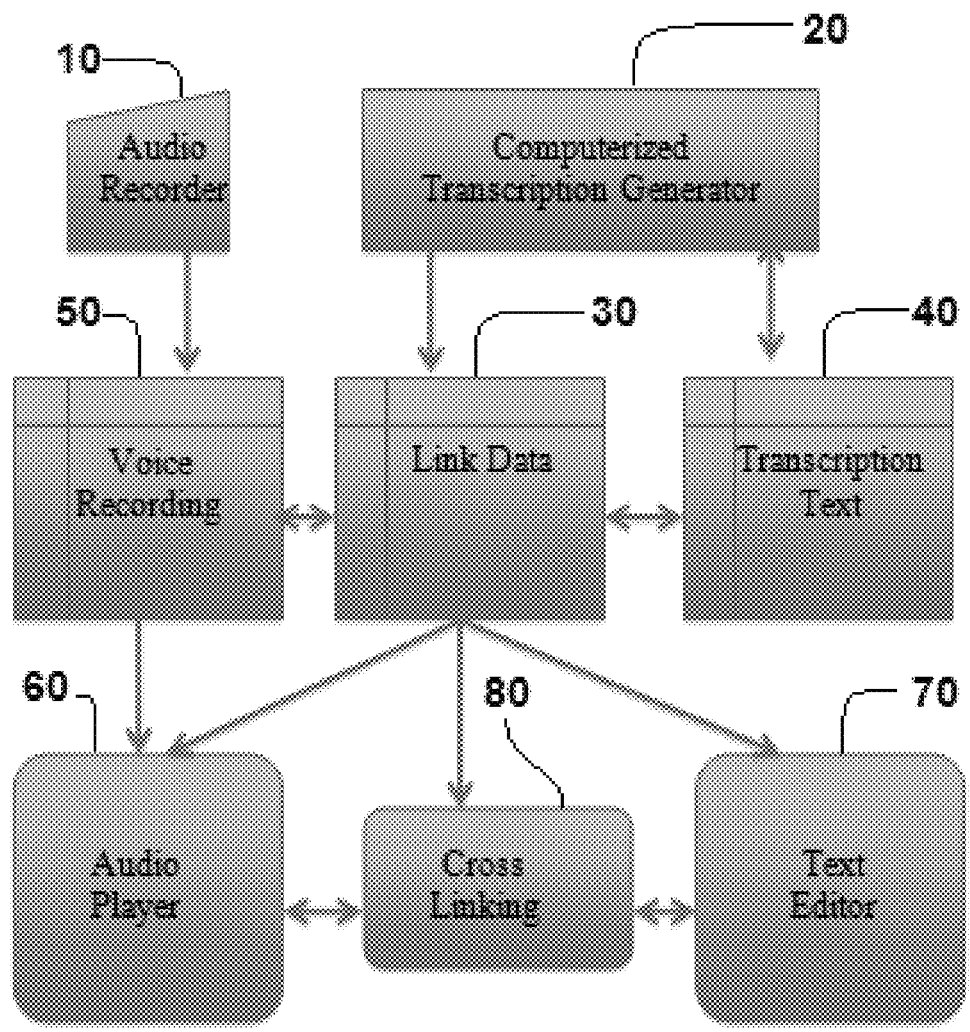
FIG. 1 is a flowchart of an audio transcription system of the present invention.

Referring now to the invention in more detail, FIG. 1 depicts a flowchart of a basic automatic transcription generation system included in the present invention. In the first step 10, labeled Audio Recorder, an audio recording is made by a recording process. The recording is then converted to text in the step 20 labeled Computerized Transcription Generator. Step 20 can also represent the process of generating and compiling a transcription through the mechanical turk process. The Computerized Transcription Generator creates data linking points in step 30 labeled Link Data, and also creates transcribed text in step 40 labeled Transcription Text. In the automatic transcript generation system of the present invention, the data links created in step 20 by the Computerized Transcription Generator automatically link specific text to specific points in the audio recording. As persons of ordinary skill in the art will appreciate, the specific points in the audio recording may reflect elapsed time of the audio recording, from a reference point. The specific points may also reflect specific sounds in the audio recording, or lack of sound, for example specific spoken words or audible pauses in the audio recording.

Together, the steps labeled 30 Link Data, 40 Transcription Text, and 50 Voice Recording represent data presented to the transcription editor system of the present invention. In a preferred embodiment, the transcription editor system of the present invention is depicted in the steps labeled 60 Audio Player, 70 Text Editor, and 80 Cross Linking. In this preferred embodiment, the transcription editor system includes a step 60 comprising operation of an audio player that enables a user to play the original audio recording from the Audio Recorder step 10; a step 70 comprising operation of a text editor that enables the user to edit the generated transcription text from the Transcription Text step 40; and a step 80 comprising operation of a "Cross Linking" module. In the preferred embodiment, the Cross Linking step 80 allows a user to determine the corresponding points between the transcription text and the audio recording, according to the link data file. In an exemplary embodiment, the corresponding points between the text and the recording are determined by the positions in the text to times in the recording. Other techniques may be employed in Cross Linking step 80, including linking points between the text and specific words or sounds or phonemes in the recording, as well as linking points in the text to audible gaps in the recording.

Figure 2:
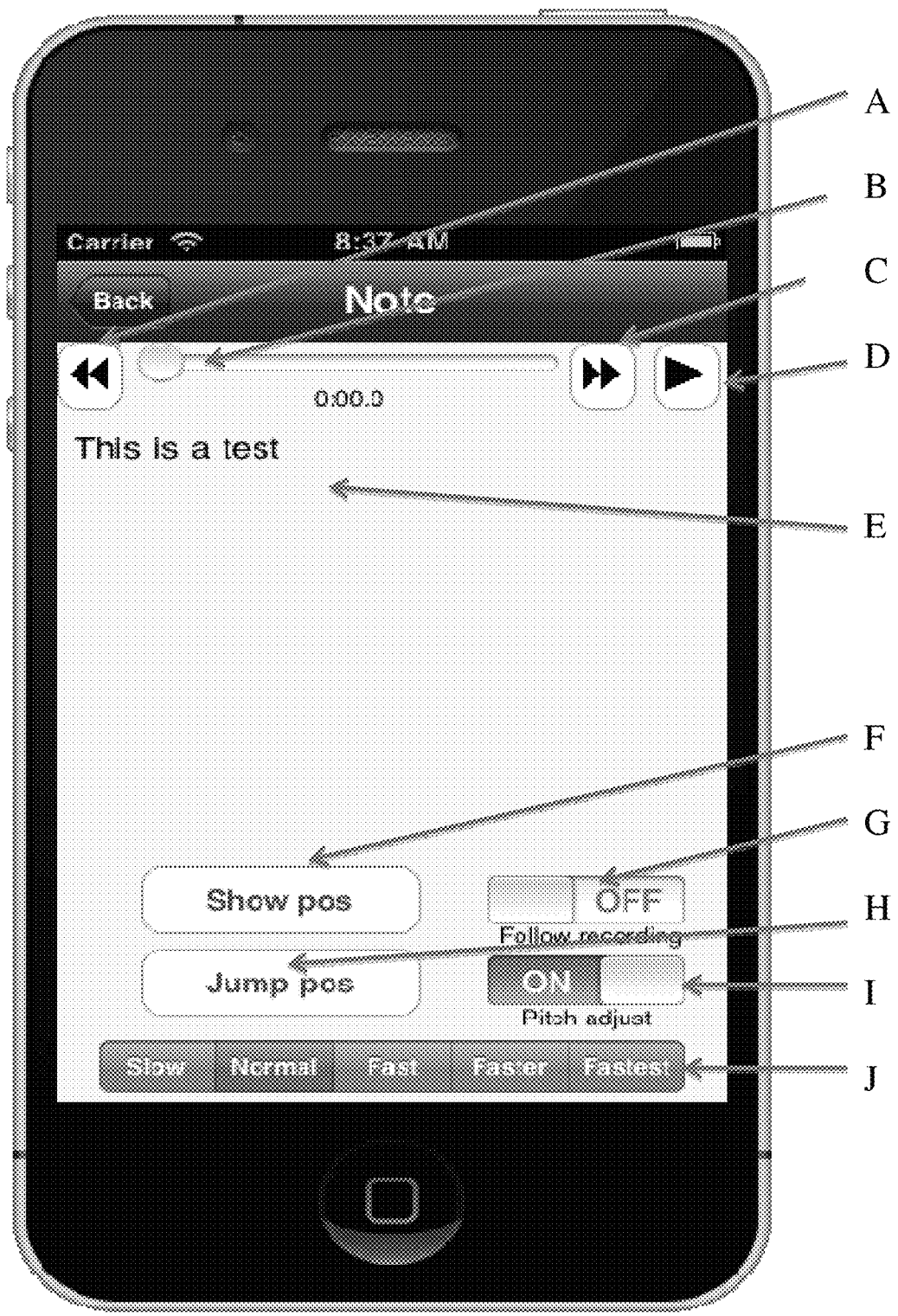
FIG. 2 is a view of a smartphone-enabled graphical user interface of an embodiment of the present invention.

Referring now to the embodiment of the invention shown in FIG. 2, the system of the present invention may be embodied in an application for a Smartphone or other portable electronic devices that include audio recording and playback capabilities. In the embodiment shown in FIG. 2, Buttons A, B, C, and D are used to control the playback of the audio recording. Specifically, Button D is used to start and stop playback. Button A performs a rewind function, moving the playback to a prior position in the recording. Conversely, Button C performs a scan or fast forward operation, permitting the user to move the playback to a subsequent position in the recording. In a preferred embodiment, a single touch of either Button A or Button C will perform a fixed time segment rewind or fast forward, respectively. For example, a single touch of Button C may jump the recording forward 5 seconds. The single touches of Buttons A and C may be serially performed, so that for example, 3 quick touches of Button A may automatically rewind the playback three 5-second segments, for a total rewind of 15 seconds.

In the Smartphone-enabled embodiment shown in FIG. 2, Button B is a slider display that moves along a playback bar while the audio is playing. The full length of the playback bar represents the duration of the recorded audio. As the audio is playing, Button B represents the actively playing audio's relative position within the overall duration of the recorded audio. Button B also displays relative position of the recorded audio when the playback is paused. Button B can also be dragged by the user, in order to jump to any specific location in the recording. In the embodiment depicted in FIG. 2, Buttons A, B and C can be used either while the recording is stopped or while it is running.

Referring further to FIG. 2, E depicts a window displaying an excerpt of transcription text that is linked to the segment of audio depicted by the position of Button B. In the preferred embodiment, a text cursor (not shown) will indicate to the user the precise location of the audio recording in the displayed text. Button F when pressed will jump the text cursor to the current position in the recording. Switch G turns on or off the "follow recording" mode. When the follow recording mode is "on," or enabled, the text cursor will automatically move to the current phrase during playback or whenever controls A, B or C are used to change the current playback position. In the embodiment shown in FIG. 2, Button H causes the playback position in the recording to jump to the current cursor position in the text. Operation of Switch I permits a user to turn on or off the system's pitch correction. In the preferred embodiment, when pitch correction is enabled, and the recording is playing at fast or slow speed, the pitch is adjusted back to what it was at normal speed. The array of controls depicted by Button set J is used to control the speed of playback.

The advantages of the present invention include, without limitation,

1. Jump to position—this function will jump the playback position in the recording to the corresponding cursor position in the text display;

2. Show position—this function moves the cursor in the text display to the current playback position; and 3. Track playback (on/off)—this function causes the cursor in the text editor to automatically move forward and track the current position as the audio recording is playing back.

Exemplary Embodiment

In an exemplary operation of the teaching of the present invention, a user might wish to generate a transcription of an oral recitation of a speech:

Four score and seven years ago our fathers brought forth on this continent a new nation, conceived in liberty, and dedicated to the proposition that all men are created equal.

Now we are engaged in a great civil war, testing whether that nation, or any nation, so conceived and so dedicated, can long endure. We are met on a great battle-field of that war. We have come to dedicate a portion of that field, as a final resting place for those who here gave their lives that that nation might live. It is altogether fitting and proper that we should do this.

But, in a larger sense, we can not dedicate, we can not consecrate, we can not hallow this ground. The brave men, living and dead, who struggled here, have consecrated it, far above our poor power to add or detract. The world will little note, nor long remember what we say here, but it can never forget what they did here. It is for us the living, rather, to be dedicated here to the unfinished work which they who fought here have thus far so nobly advanced. It is rather for us to be here dedicated to the great task remaining before us—that from these honored dead we take increased devotion to that cause for which they gave the last full measure of devotion—that we here highly resolve that these dead shall not have died in vain—that this nation, under God, shall have a new birth of freedom—and that government of the people, by the people, for the people, shall not perish from the earth.

Further in this exemplary embodiment, the audio recorder, transcription generator, audio player, text editor, and all processes necessary to perform the steps depicted in FIG. 1 are embodied in a handheld electronic device. In the operation of the exemplary embodiment, the speech will be recorded by the Audio Recorder in step 10, and the Computerized Transcription Generator of step 20 will generate transcription text substantially simultaneously.

Ideally, the generated transcription text of the speech will be as it is represented above. However, for a variety of reasons the generated transcription may contain errors. The operation of the present invention permits a user to correct such errors. In a long recording, the user will need to be able to jump to specific locations to correct errors. For example, if a phone ringing in the background caused the transcriber to skip a sentence, the user will need to quickly jump to that part of the recording to listen and recreate that sentence.

In this exemplary embodiment, the transcription of the recorded speech may be generated simultaneously with the recording of the speech. Furthermore, playback of the recorded speech may be accomplished simultaneously with recording of subsequent speech. Persons of ordinary skill in the art will appreciate that such operations are possible with digital recording techniques, and furthermore that existing microphone and personal listening technology permit such simultaneous operations without the possibility of interference or data corruption. Thus, in this example, the user might begin his editing of the generated transcription of the text even while the subsequent parts of the speech are continuing to be recorded. Displaying the generated transcript of the first sentence might produce rough text as depicted in FIG. 3:

Thorns core and seven years ago are fathers brought forth on this continent a new nation, conceived in liberty, and dedicated to the proposition fat all men are created equal.

As can be seen—indicated by italics, the exemplary generated transcription contains four text errors requiring correction. In this example, the user simply places his text editor cursor next to the word and/or character to be corrected, and makes the correction to the text. This correction can be accomplished either by a keypad function or by a voice-to-text function. To move the text editor cursor to the first desired correction the user could use the playback Jump to Position function to advance to the first edit, at the spoken word "Four," which was transcribed as "Thorn." This operation places the text editor cursor where it is convenient in order to correct "Thorns core" to "Four score." Then, in order to move to the next desired correction location, the user may use slider Button B or the scan forward button C to advance to the word "are." FIG. 3 depicts on a scale below the transcription text, the elapsed time from the start of the recording. Thus, the word "are" is spoken more than 5 seconds after the recording started, but less than 10 seconds after the recording started. In this exemplary embodiment, each tap of Button C of FIG. 2 advances playback 5 seconds. Accordingly, a single tap of Button C advances the playback to the vicinity of the incorrect word "are," where it can be corrected by the user with the text editor. Subsequently in this example, a user could tap playback Button C six more times from the corrected word "our," in order to reach the word "fat," which is depicted in FIG. 3 as appearing near 35 seconds elapsed from the start of the speech. After advancing playback in this manner, the user may employ the Jump to Position feature to place the text editor cursor in the corresponding position in the transcription, so that it may be corrected. In a similar fashion, the user could tap the playback Button C sufficient times to reach the occurrence of the word "fat" near 1330 seconds elapsed. However, it is likely that sliding playback slider Button B will permit the user to reach the word "fat" near 1330 seconds elapsed more quickly than by tapping Button C many times.

In the manner thus described, a user may proceed through the entire speech using the playback control buttons, Show Position function, and Jump to Position function in order to find and correct transcription errors. Furthermore, as the user proceeds through the speech, the present invention provides playback tracking, where the text editor cursor moves through the generated transcription text at a position corresponding to the audio playback. This feature permits real time verification and correction of automatically generated transcripts.

After corrections are made, feedback can be sent back to the transcription system. If a computer system is used, the feedback from the corrections can be used by a machine learning algorithm to improve the quality of the transcription algorithm. In the case of turks, the feedback can be used to give performance evaluations of the turks responsible for each segment. Feedback can be sent either after each change or after the user completes the editing process and closes the text editor page.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A system for correcting errors in an audio transcription comprising:
   an audio recorder that comprises an analog audio recorder;
   a transcription generator that comprises an analog-to-digital audio converter;
   a recording of speech;
   a collection of link data;
   transcription text of said speech;
   an audio player;
   a system of cross linking;
   a text editor including a text display with a cursor;
   a playback controller located on the text editor screen, wherein the playback controller includes a slider capable of allowing a user to jump to any part of a recording by simply dragging the slider; and
   a first button that causes the text cursor to jump to a corresponding playback position, a second button that disables a text tracking function of the audio transcription, and an optional third button that controls speed of a playback.

2. The system for correcting errors in an audio transcription of claim 1, further including a smart-phone enabled graphical user interface for directing the audio player to jump to the position in the audio recording corresponding to the cursor's position in the transcription text.

3. The system for correcting errors in an audio transcription of claim 1, further including a smart-phone enabled graphical user interface for moving the cursor to the position in the transcription text corresponding to the audio player's position during audio playback of the recording of speech.

4. The system for correcting errors in an audio transcription of claim 1, where the cursor automatically moves through the transcription text corresponding to the audio player's position during audio playback of the recording of speech.

5. The system for correcting errors in an audio transcription of claim 1, where the text editor comprises a voice-to-text generator.

6. The system for correcting errors in an audio transcription of claim 1, where the transcription generator comprises a voice-to-text generator.

7. The system for correcting errors in an audio transcription of claim 1, where the audio recorder comprises a digital audio recorder.

8. The system for correcting errors in an audio transcription of claim 1, where the system comprises a handheld electronic device.

9. The system for correcting errors in an audio transcription of claim 1, where the system further comprises a feedback system between the text editor and the transcription generator.

10. The system for correcting errors in an audio transcription of claim 1, where the transcription generator comprises a mechanical turk process.

11. The system for correcting errors in an audio transcription of claim 1 comprises a voice-to-text generator associated with at least one of the text editor and the transcription generator.

12. A method for correcting errors in an audio transcription comprising:
   recording an analog audio transmission with an analog audio recorder;
   converting the analog format to a digital format with a transcription generator including an analog-to-digital audio converter;
   generating a transcription of said audio transmission;
   storing said audio recording;
   generating a collection of link data;
   storing the text of said transcription;
   playing the recorded audio transmission;
   cross linking said stored text with said recorded audio transmission;
   editing said text using a cursor;
   dragging a slider on a playback controller located on the text editor screen to jump to any part of the recording; and
   jumping the text cursor to a corresponding playback position by a first button, disabling a text tracking function of the audio transcription by a second button, and optionally controlling speed of a playback by a third button.

13. The method for correcting errors in an audio transcription of claim 12, further comprising:
   directing the audio player to jump to the position in the audio recording corresponding to the cursor's position in the transcription text.

14. The method for correcting errors in an audio transcription of claim 12, further comprising:
   moving the cursor to the position in the transcription text corresponding to the audio player's position during audio playback of the recording of speech.

15. The method for correcting errors in an audio transcription of claim 12, further comprising:
moving the cursor through the transcription text corresponding to the audio player's position during audio playback of the recording of speech.

16. The method for correcting errors in an audio transcription of claim 12, further comprising:
editing said text with a voice-to-text generator.

17. The method for correcting errors in an audio transcription of claim 12, further comprising:
providing feedback from the step of editing to the step of generating a transcription.

18. The method for correcting errors in an audio transcription of claim 17, further comprising:
changing the step of generating a transcription in response to feedback from the step of editing.

19. A handheld transcription editing device comprising:
a wireless communication capability;
an audio recorder;
a transcription generator;
a recording of speech;
a collection of link data;
transcription text of said speech;
an audio player;
a system of cross linking;
a text editor including a text display with a cursor;
a playback controller located on the text editor screen, wherein the playback controller includes a slider capable of allowing a user to jump to any part of a recording by simply dragging the slider; and
a first button that causes the text cursor to jump to a corresponding playback position, a second button that disables a text tracking function of the transcription editing device, and an optional third button that controls speed of a playback.

20. The handheld transcription editing device of claim 19, wherein the wireless communication capability comprises at least one of cellular voice capability;
cellular text capability;
cellular data capability; and
IEEE 802.11 wireless capability.

* * * * *